(12) United States Patent
Pinault

(10) Patent No.: US 7,177,656 B2
(45) Date of Patent: Feb. 13, 2007

(54) METHOD OF SYNCHRONIZING BASE STATIONS INTERCONNECTED BY A LOCAL AREA NETWORK

(75) Inventor: Francis Pinault, Bois-Colombes (FR)

(73) Assignee: Alcatel, Paris (FR)

( * ) Notice: Subject to any disclaimer, the term of this patent is extended or adjusted under 35 U.S.C. 154(b) by 487 days.

(21) Appl. No.: 10/445,962

(22) Filed: May 28, 2003

(65) Prior Publication Data

US 2004/0082349 A1    Apr. 29, 2004

(30) Foreign Application Priority Data

Jun. 6, 2002   (FR) .................................. 02 06962

(51) Int. Cl.
*H04B 15/00*   (2006.01)
(52) U.S. Cl. ...................... 455/502; 455/561; 455/560; 455/513; 455/512
(58) Field of Classification Search ................ 455/500, 455/502, 561, 560, 512, 513
See application file for complete search history.

(56) References Cited

U.S. PATENT DOCUMENTS

| | | | |
|---|---|---|---|
| 5,519,759 A * | 5/1996 | Heineck et al. .......... 455/422.1 |
| 6,185,429 B1 * | 2/2001 | Gehrke et al. .............. 455/502 |
| 6,359,869 B1 * | 3/2002 | Sonetaka ..................... 370/337 |
| 6,590,891 B1 * | 7/2003 | Jacquet et al. .............. 370/350 |
| 6,788,947 B2 * | 9/2004 | Becker et al. .............. 455/502 |
| 6,847,826 B1 * | 1/2005 | Wesby et al. ............... 455/502 |
| 6,930,996 B2 * | 8/2005 | Rudolf et al. ............... 370/350 |
| 2001/0041594 A1 * | 11/2001 | Arazi et al. ................. 455/561 |

FOREIGN PATENT DOCUMENTS

WO    WO 9726768       7/1997
WO    WO 0178246 A1   10/2001

* cited by examiner

*Primary Examiner*—Edan Orgad
(74) *Attorney, Agent, or Firm*—Sughrue Mion, PLLC

(57) ABSTRACT

The present invention relates to a method of synchronizing a plurality of base stations in a wireless telecommunications system (100) comprising base stations (BS1 to BS5) interconnected by an IP architecture local area network (10), the method including a step of hierarchical organization carried out in each group of base stations (BS1 to BS4) covering interconnected picocells (P1 to P4) by assigning positive integer numbers (No.1 to No.4) in increasing order and a fine synchronization step involving listening to a lower numbered base station of its group.

7 Claims, 1 Drawing Sheet

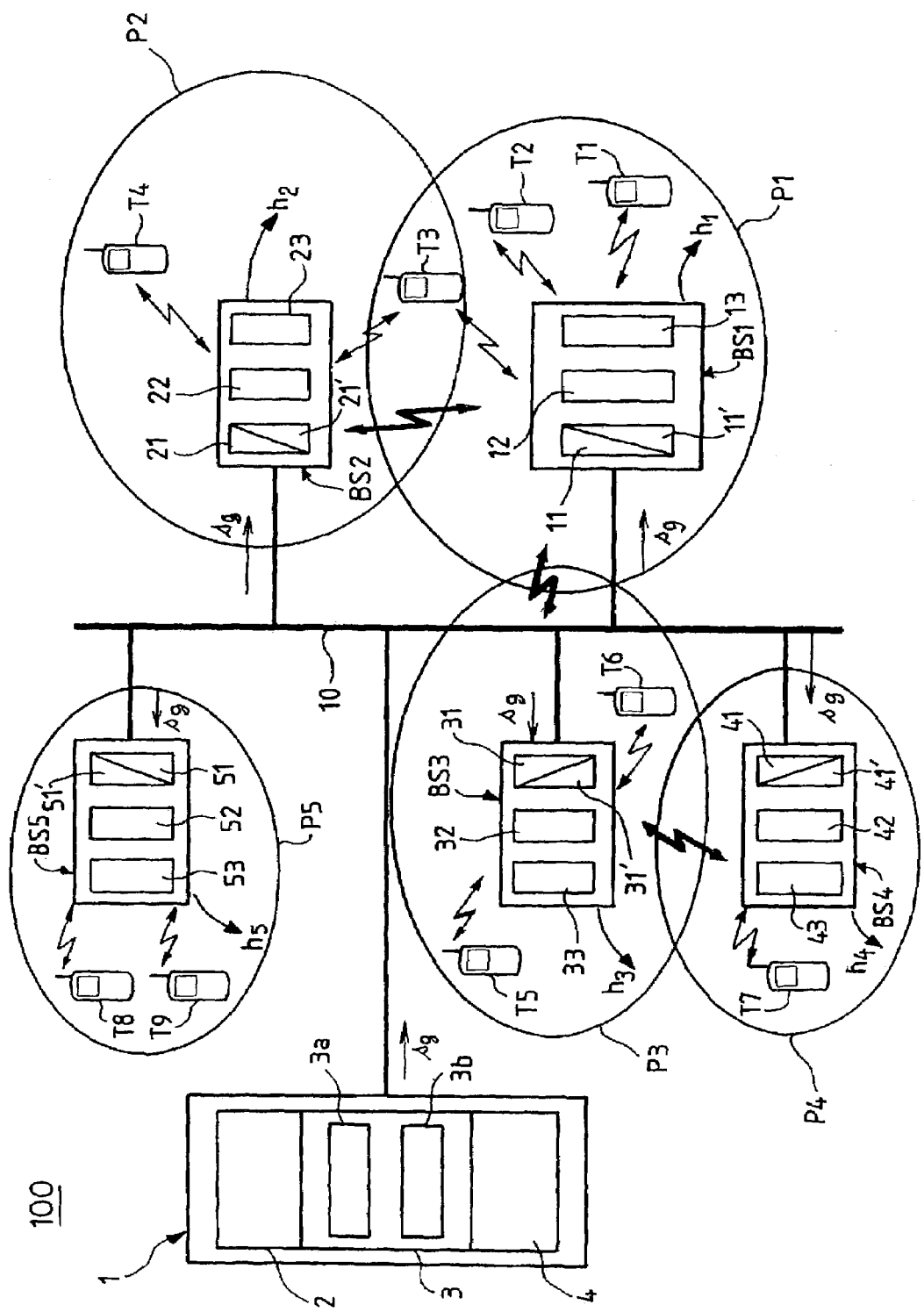

METHOD OF SYNCHRONIZING BASE STATIONS INTERCONNECTED BY A LOCAL AREA NETWORK

BACKGROUND OF THE INVENTION

The present invention relates to a telecommunications system comprising base stations, for example of the Digital European Cordless Telecommunications (DECT) type, managing picocells and interconnected by a local area network, in particular an Internet Protocol (IP) local area network.

A local area network using the IP as its transmission protocol cannot synchronize DECT base stations with each other and thereby provide handover, i.e. continuity of call transmission when a mobile terminal such as a DECT mobile telephone moves from one cell to another. This is known in the art.

The document WO-01-78246 describes a telecommunications system comprising a plurality of base stations using the BLUETOOTH technology for short-range radio communication, the base stations each covering a picocell and being interconnected by a local area network.

The above document discloses a method of synchronizing base stations including the following steps:

a step of coarse synchronization of each base station adjoining an active base station, i.e. one communicating with a mobile terminal, the active base station sending a coarse synchronization signal to the adjoining base stations via the local area network, a step of sending a reference clock, the active base station periodically sending the reference clock at a high power level in the context of the frequency hopping aspect of the BLUETOOTH technology, and a step of fine synchronization of an adjoining base station when the mobile is detected in the intersection area between the active picocell and the adjoining picocell, by listening either to the active base station or to the moving mobile station.

The base stations are synchronized by tricking a moving mobile terminal into believing that it still in the same picocell so that it retains both the synchronization and the frequencies of the original active base station with the associated frequency hopping law.

This synchronization method is complex and must be executed "dynamically", i.e. immediately handover is required.

Furthermore, to effect this synchronization, it is necessary to provide a set of supplementary radio means in each base station adapted to be configured when a mobile terminal is moving. These means must be available for the moving mobile terminal and cannot be used for other tasks. This impacts on the cost of the configurations to be implemented. In particular, this type of technique is not suitable for high traffic levels.

Users of a transmission system, for example a professional transmission system, are committed to maximizing the return on the investment in their infrastructures.

U.S. Pat. No. 5,519,759 describes a method of synchronizing a plurality of base stations in a DECT wireless telecommunications system comprising base stations each covering a picocell and interconnected by a local area network comprising a plurality of switches. The method includes a system initialization phase including a step, carried out within each group of base stations covering adjoining picocells, of organizing the base stations hierarchically. This hierarchical organization step consists in a first base station of the group concerned broadcasting a synchronization signal, the other stations of the group that are capable of receiving the signal receiving it and measuring its power, transmitting the results of the power measurements to a central server, comparing the results to determine the station that received the highest power, instructing that adjoining station to synchronize to the first station and then to send in its turn a synchronization signal, and repeating the above process until all the stations constituting a group have been synchronized in succession.

BRIEF SUMMARY OF THE INVENTION

An object of the present invention is to provide a simpler method that is less costly to implement for synchronizing base stations, in particular DECT base stations, interconnected by a local area network, in particular an IP local area network.

To this end, the present invention proposes a method of synchronizing a plurality of base stations in a wireless telecommunications system comprising base stations each covering a picocell and interconnected by a local area network, the method including a system initialization phase including a step of hierarchically organizing the base stations carried out in each group of base stations covering adjoining picocells. The method is characterized in that the step of hierarchically organizing the base stations includes assigning positive integer numbers in increasing order to each of the cells in a group of base stations covering adjoining picocells as a function of the distribution of said base stations.

The method of the invention, based on synchronizing base stations when initializing the network, relies on the time division multiple access (TDMA) modulation characteristic conventionally used for DECT calls and enabling a plurality of calls to be set up simultaneously on the same frequency.

The invention also provides a telecommunications system comprising base stations each covering a picocell and interconnected by a local area network and a synchronization server including means for executing a system initialization phase including a step of hierarchically organizing the base stations carried out in each group of base stations covering adjoining picocells. The system is characterized in that said synchronization server includes means for assigning positive integer numbers in increasing order to each of the cells in a group of base stations covering adjoining picocells as a function of the distribution of said base stations.

The system of the invention has the advantage of being transparent for the mobile terminals, necessitating no addition of costly equipment to each base station. The radio transmitters and the radio receivers already present in each base station are respectively used to send the reference clock or the fine clock and to listen to one of the base stations with a lower number.

The system preferably includes means for dynamically managing the system initialization phase connected to means for storing the topology of the system and in particular the distribution of the picocells.

Each base station includes means for receiving IP messages such as the coarse synchronization signal in the form of packets of data.

Each base station can advantageously include IP voice and/or data packet timing means ahead of TDMA radio transmission of the packets to the mobile terminals of the system. The timing means eliminate the effect of the jitter generated by transmission via the local area network, i.e. the uncertainty as to the arrival time of the data packets at the base stations.

Of course, the foregoing description has been given by way of illustrative example only. Any means can be replaced by equivalent means without departing from the scope of the invention.

BRIEF DESCRIPTION OF THE DRAWINGS

Features and objects of the present invention will emerge from the detailed description given hereinafter with reference to the accompanying drawing, which is offered by way of illustrative and non-limiting example.

The single FIGURE is a diagrammatic representation of a transmission system 100 of the invention comprising five DECT base stations BS1 to BS5 covering respective picocells P1 to P5 and interconnected by an IP architecture local area network 10.

DETAILED DESCRIPTION OF THE INVENTION

In this preferred embodiment of the invention, four of the base stations BS1 to BS4 have picocells connected to each other, each picocell of a base station overlapping at least one other picocell of an adjoining base station. DECT mobile terminals of the system 100, such as mobile telephones T1 to T7, are able to move around in the picocells P1 to P4 covered by that group of base stations. Thus the invention can execute a handover as soon as the system 100 is initialized.

Conversely, the fifth base station BS5 covers an isolated picocell P5 that functions independently of the others.

The system 100 includes a synchronization server 1 including:
means 2 for storing the topology of the system 100, and
a coarse synchronization module 3 including:
   means 3a for generating IP messages to be transmitted via the local area network to the base stations in particular,
   means 3b for hierarchically organizing the grouped base stations BS1 to BS4, and
   means 4 for dynamically managing the initialization phase of the system 100.

The hierarchical organization is defined by assigning positive integer numbers No.1, No.2, No.3, No.4 in increasing order to the respective base stations BS1, BS2, BS3, BS4, the assignment being fixed as a function of the order of the picocells P1 to P4, which is communicated by the means 2. The hierarchical organization is conceived so that each grouped base station BS1 to BS4 can have an adjoining base station with a lower number. By way of example, table 1 below sets out three other arrangements of the numbers, with the same priority base station BS1.

TABLE 1

| | Base station BS1 | Base station BS2 | Base station BS3 | Base station BS4 |
|---|---|---|---|---|
| Configuration 1 | No. 1 | No. 2 | No. 4 | No. 3 |
| Configuration 2 | No. 1 | No. 3 | No. 2 | No. 4 |
| Configuration 3 | No. 1 | No. 3 | No. 4 | No. 2 |

The system 100 is reinitialized as soon as necessary (reorganization or extension of the system, failure of a priority base station, etc.) so that a slave or isolated base station can become the master station and/or the distribution of the picocells can be changed. It is therefore preferable for all base stations to be equipped with the same means.

Each base station BS1 to BS5 therefore includes:
means 11 to 51 for receiving IP messages transmitted via the local area network by voice and/or data packets and coupled to means 11' to 51' for timing the packets to be transmitted by radio,
means 12 to 52 for sending time division multiple access (TDMA) digital radio signals, and
means 13 to 53 for receiving modulated radio signals that are used by the grouped base stations BS1 to BS4 to listen to one of the base stations with a lower number.

The base stations BS2, BS3, respectively No.2 and No.3, can listen to the priority base station BS1 independently. Also, the base station BS3, which has a higher number, can be synchronized before the base station BS2.

The means 4 manage the initialization phase of the system 100 dynamically, by registering on the fly the base stations and their synchronized terminals, managing waiting base stations not yet synchronized, and updating the means 3 and in particular the location tables.

To initialize the system 100, the means 2 establish the optimum shape and dimensions of each picocell and the distribution of the picocells to maximize listening between adjoining base stations. The means 2 then store the meshing of the picocells of the system 100 and construct location tables for the terminals T1 to T7 to be synchronized. This information on the topology of the system 100 is accessible to the means 3 and 4.

Consider the execution of a phase for initializing the system 100. The fine synchronization of the non-priority base stations is symbolized by thick double-headed arrows and that of the mobile terminals by thin double-headed arrows.

First of all, each base station BS1 to BS5 receives a coarse synchronization signal $s_g$ sent in the form of an IP message by the means 3a and broadcast via the local area network 10.

After communicating with the hierarchical organization means 3b, the base station BS1 is identified as the priority base station, and thus station No.1, and decides to send via the sending means 12 a reference clock h, in the form of a TDMA radio signal containing synchronization time information. The terminals T1, T2, T3 in the picocell P1 of the priority base BS1 at this time are also synchronized.

In parallel with or consecutively to the priority base station BS1, the base station BS2, after communicating with the hierarchical organization means 3b, is identified as non-priority base station No.2. Also, using its means 23 and the information contained in the signal $s_g$, the base station BS2 opens a receive window that is sufficiently wide to find and capture the reference clock $h_1$ for its fine synchronization. The sending means 32 then send a fine clock $h_2$ containing said time information: the terminal T4 in its picocell P2 is synchronized.

In a variant, the base station BS2 can also be synchronized by listening to a signaling message updating the priority base station BS1 and the mobile terminal T3 in the area of intersection of the picocells P1 and P2, in which case the time information is contained in the signaling frame. In fact, the base station BS2 is then synchronized indirectly to the priority base station BS1.

In parallel with or consecutively to the other base stations, the base station BS3 is identified as non-priority base station No.3. The base station BS3 waits for fine synchronization and listens to the priority base station BS1. After receiving the reference clock for its synchronization, the base station BS3 sends a fine clock $h_3$ containing said time information: the terminals T5, T6 in its picocell P3 are synchronized.

Finally, in an analogous fashion, the base station BS4 is identified as non-priority base station No.4. Also, it captures the fine clock $h_3$ sent by the adjoining base station BS2 of lower number for its synchronization and sends a fine clock $h_4$ enabling the terminal T7 in its picocell P4 to be synchronized.

Also, the fifth base station BS5 sends its own reference clock $h_5$ to synchronize with the terminals T8, T9 of its isolated picocell P5.

Of course, the invention is not limited to the embodiment that has just been described.

The invention also applies to a set of base stations interconnected by means of the Internet Protocol and using TDMA modulation with a protocol other than that for the DECT.

Finally, any means can be replaced by equivalent means without departing from the scope of the invention.

The invention claimed is:

1. A method of synchronizing a plurality of base stations in a wireless telecommunications system, the method comprising performing a system initialization phase which comprises:

initializing said system including broadcasting a coarse synchronization signal from a synchronization server to the base stations via a local area network, and hierarchically organizing groups of base stations covering adjoining picocells by assigning positive integer numbers in increasing order to each of the cells in the group of base stations covering adjoining picocells as a function of the distribution of said base stations; and synchronizing said base stations in increasing order based on the assigned integer numbers.

2. A method according to claim 1, wherein the synchronizing of said base stations comprises:

sending a fine synchronization reference clock from a first base station; and synchronizing the base stations using said clock, successively and in increasing order based on the assigned integer numbers.

3. A telecommunications system comprising:

a plurality of base stations each covering a picocell and interconnected by a local area network, and a synchronization server connected to said local area network;

wherein said synchronization server comprises a base station organizing unit which hierarchically organizes groups of base stations covering adjoining picocells by assigning positive integer numbers in increasing order to each of the cells in the group of base stations covering adjoining picocells as a function of the distribution of said base stations; and wherein after said base station organizing unit assigns positive integer numbers to all of said base stations, said base stations are synchronized in increasing order based on the assigned positive integer numbers.

4. A telecommunications system according to claim 3, wherein the synchronization server further comprises a storage unit which stores the topology of the system.

5. A telecommunications system according to claim 3, wherein the synchronization server further comprises a signal broadcasting unit which broadcasts a coarse synchronization signal to the base stations via the local area network.

6. A telecommunications system according to claim 5, wherein each base station further comprises: receiving units which receive the coarse synchronization signal;

signal generation units which generate fine synchronization reference clock signals; and synchronization units which receive the fine synchronization reference clock signals.

7. A telecommunications system according to claim 5, wherein said coarse synchronization signal comprises Internet Protocol voice or data packets.

* * * * *